United States Patent [19]

Carter

[11] Patent Number: 4,726,605

[45] Date of Patent: Feb. 23, 1988

[54] SEAT BELT ASSEMBLY

[76] Inventor: Raymond M. Carter, Trade Winds Marina/Panay Way, Marina Del Rey, Calif. 90292

[21] Appl. No.: 920,059

[22] Filed: Oct. 17, 1986

[51] Int. Cl.[4] .............................................. B60R 21/10
[52] U.S. Cl. ..................................... 280/801; 280/808
[58] Field of Search ............... 280/801, 802, 804, 806, 280/807, 808, 803

[56] References Cited

U.S. PATENT DOCUMENTS

| 4,262,932 | 4/1981 | Motonami et al. | 280/806 |
| 4,284,295 | 8/1981 | Takeda et al. | 280/803 |
| 4,291,919 | 9/1981 | Schmid et al. | 280/801 |
| 4,315,639 | 2/1982 | Booth et al. | 280/803 |
| 4,422,668 | 12/1983 | Thill et al. | 280/808 |
| 4,431,233 | 2/1984 | Ernst | 280/801 |

Primary Examiner—John J. Love
Assistant Examiner—Ross Weaver
Attorney, Agent, or Firm—Jack C. Munro

[57] ABSTRACT

A passenger seat belt assembly to be utilized in conjunction with a passenger seat of a vehicle such as an automobile. The passenger seat is mounted alongside of a door through the body of the vehicle. The seat belt assembly utilizes two separate belts, the outer end of both belts being fixedly mounted to the door. The opposite end of each belt is fixedly mounted onto a pistol grip latching handle. This latching handle is to be connectable either with a female latching device mounted on the door or a female latching device located across the passenger seat.

15 Claims, 6 Drawing Figures

SEAT BELT ASSEMBLY

BACKGROUND OF THE INVENTION

The field of this invention relates to a seat belt assembly, and more particularly to a seat belt assembly for a vehicle such as an automobile which provides for quick and easy operation.

The present invention will be discussed in conjunction with a seat belt assembly for an automobile. However, it is to be considered to be within the scope of this invention that the seat belt assembly could be incorporated within other types of vehicles such as airplanes, trains, buses, trucks, boats, and so forth. Actually, it is envisioned that in any environment wherein a seat is utilized, and it is desired to restrain the occupant within that seat, that the structure of this invention could be utilized.

The use of seat belts within automobiles is exceedingly comon. At the present time, almost every automobile that is manufactured is manufactured with a seat belt for each seat of the automobile. Within a substantial number of jurisdictions, it is a law that each occupant of the automobile must be wearing a seat belt during operation of the vehicle. A common form of a seat belt assembly includes two separate belts, one being a lap belt and the other being a chest belt. In some installations these two separate belts are formed as one belt, but when installed in position across the passenger seat, a portion of the single belt is positioned across the occupant's lap and another portion of the belt extends across the occupant's chest.

It is of course necessary to have the seat belt assembly to be moved to a "out-of-the-way" position during entry into and egress from the vehicle. In order to provide this "out-of-the-way" stowage position, it has been common to have the entire seat belt assembly to move by a retraction mechanism to a position located rearwardly of the passenger seat.

This rearward position of the seat belt assembly has certain disadvantages. The primary disadvantage is that the occupant must reach behind the seat, find the seat belt assembly, and then move such to the installed position across the occupant's body. Although this installing procedure should be accomplished prior to operating of the vehicle, all to frequently it is accomplished while the vehicle is moving. There have been numerous occasions where the driver of the vehicle has momentarily taken his eyes off the road to install the seat belt assembly, and as a result has found himself involved in an accident which could have been avoided if the driver had had his eyes on the road.

There has long been a need to install a seat belt assembly within a vehicle wherein its stowage position is at a location which naturally makes it convenient to locate the seat belt assembly in the installed position. In other words, the seat belt assembly is located to facilitate movement of the seat belt assembly from the stowage assembly to the installed position.

SUMMARY OF THE INVENTION

The primary objective of the structure of the present invention is to achieve the foregoing need in conjunction with a vehicular passenger seat belt assembly.

The seat belt assembly of the present invention is to be totally mounted in a stowage position on the inside surface of the door providing access into the passenger compartment of the vehicle. Within the passenger compartment directly adjacent to the door, there is a passenger seat. The passenger seat belt assembly includes two separate belts with one end of each belt being attached to the door in substantial alignment with the back of the seat. The opposite end of each belt is mounted on a pistol grip shaped handle. This handle includes a latching pawl. Also mounted within the forward portion of the door and spaced from the back of hte passenger seat and in substantial alignment with the free outer edge of the bottom of the seat is a female latching device. This latching pawl is to be connectable with the female latching device when the passenger seat assembly is in the stowage position. A second female latching device is mounted in position across the passenger seat. This latching pawl can be removed from the door mounted latching device to engage with the second latching device which in turn will cause the one of the belts to be located across the lap of the occupant and the second belt to be naturally positioned across the chest of the occupant. There may be included an adjustment device in conjunction with the door to provide for height adjustment of the chest belt to accommodate for different height occupants and also occupants of various weights.

Another objective of the present invention is to construct a seat belt assembly which can be manufactured at an inexpensive price and therefore sold to the ultimate consumer at an inexpensive price.

Another object of the present invention is to construct a seat belt assembly which could be designed to be incorporated on most automobile doors.

DETAILED DESCRIPTION OF THE SHOWN EMBODIMENT

Figure 1:
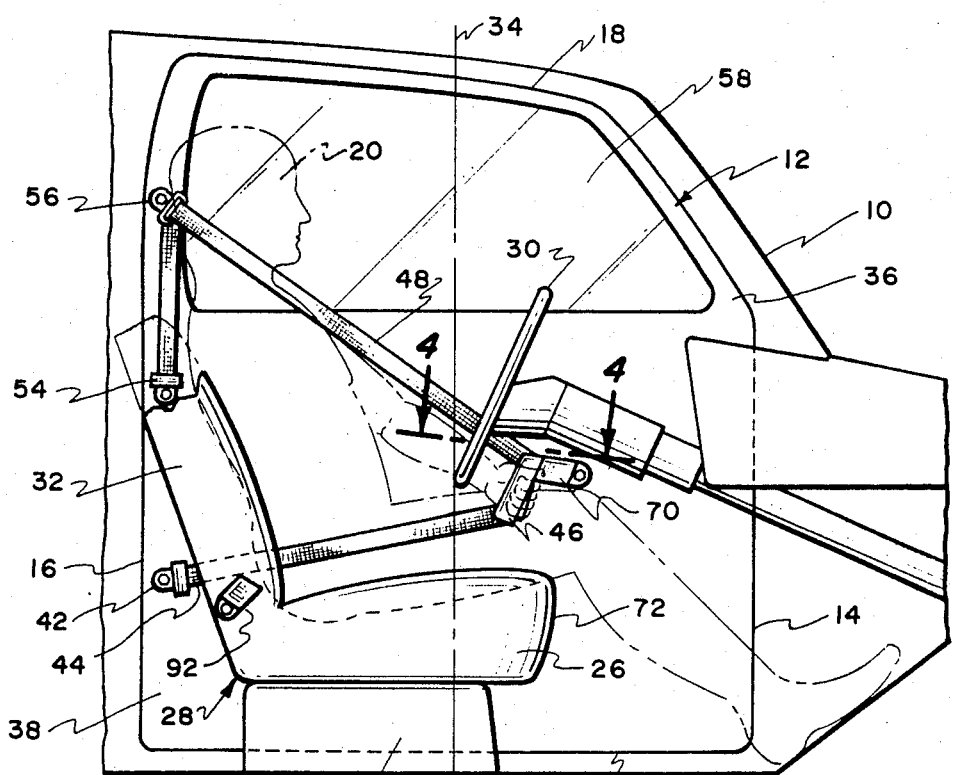
FIG. 1 is a side elevational view depicting the driver of an automobile located within the passenger compartment of the automobile, showing the seat belt assembly of the present invention in its stowage position.

Referring particularly to the drawings, there is generally depicted a vehicle which is formed of a body 10 within which is mounted a door 12. Door 12 is to be pivotally movavble about a hinge axis located at front edge 14. An appropriate door locking mechanism is to be included within the door and locked at the rear edge 16. This door locking mechanism is not shown and does not form any part of this invention. Also it is immaterial as to how the door 12 opens with respect to the body 10 or whether the hinge axis 14 is located on edge 16 or is hinged along the top edge 18 of the door. As far as this invention is concerned, it is only important to note that the door 12 is to be openable to permit entry and egress of the occupant 20 from the passenger compartment 22 located within the body 10.

Within the passenger compartment 22 there is fixedly mounted a seat base 24. On the seat base 24 is mounted a bottom 26 of a passenger seat 28. This bottom 26 will normally be adjustable longitudinally to accommodate various sizes of occupants 20. This longitudinal movement is in a direction toward and away from the steering wheel assembly 30. Attached to the bottom 26 and part of the passenger seat 28 is a back 32. The back 32 will normally be adjustable relative to the bottom 26. This back 32 assumes a substantially right angled configuration relative to the bottom 26. The bottom 26 has a seating area which is substantially horizontal. The backrest area of the back 32 is substantially vertical.

In order to facilitate description of this invention, the door 12 is shown divided by a vertical center line 34. This center line 34 divides the door 12 into a front panel 36 and a rear panel 38. The reason for the dividing of the door 12 into the front panel 36 and the rear panel 38 will become apparent further on in the description of this invention. Also, in order to facilitate the description of this invention, the door 12 has a lower edge 40.

Mounted on the rear panel 38 nearer the bottom edge 40 (as opposed to the top edge 18) is a lap belt attachment 42. This lap belt attachment 42 is located substantially in alignment with the back 32 of the passenger seat 28. Fixedly mounted to the attachment 42 is one end of a lap belt 44. The lap belt 44 will normally be constructed of a reinforced fabric material which is commonly used in conjunction with seat belts. The opposite end of the lap belt 44 is fixedly mounted to the bottom 35 end of a latchable handle 46. The latchable handle 46 is in the configuration of a piston grip. Fixedly attached to the upper end of the pistol grip latchable handle 46 is a chest belt 48. The material of construction of the chest belt 48 will be identical to the belt 44. Belt 48 is fixedly mounted to the handle 46 by means of a pin 50. In a similar manner, a pin 52 fixedly mounts the belt 44 to the handle 46.

The opposite end of the belt 48 is fixedly attached to a mounting bracket 54. This mounting bracket 54 is fixedly mounted onto the rear panel 38 of the door 12 also in substantial alignment with the back 32 of the passenger seat 28. However, it is to be noted that the mounting bracket 54 is spaced from the mounting bracket 42 and is located somewhat near the horizontal middle portion of the door 12. For purposes of this invention, it may be found desirable to include a belt retraction mechanism (not shown) as part of the mounting bracket 54. The use of such a belt retraction mechanism is deemed to be conventional and forms no specific part of this invention.

Figures 2, 3:
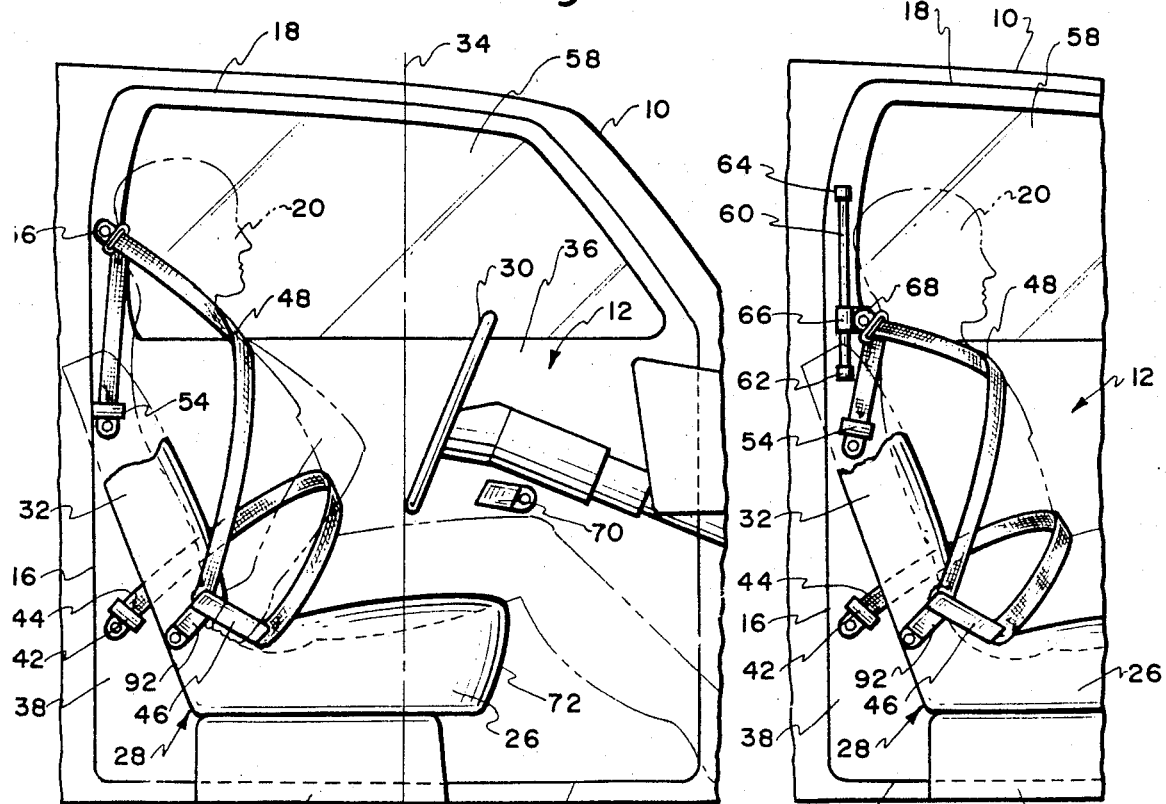
FIG. 2 is a view similar to FIG. 1, but showing the seat belt assembly of this invention in its installed position.
FIG. 3 is a view similar to FIG. 2, but showing the seat belt assembly including a vertical adjustment post mounted in conjunction with the door to provide for vertical adjustment of the chest belt of the seat belt assembly of this invention.
Figure 4:
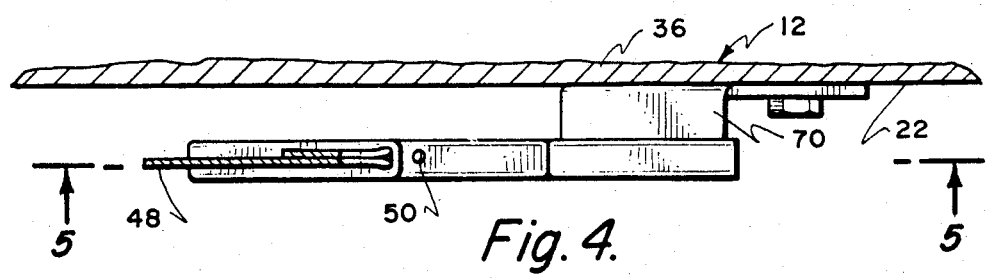
FIG. 4 is a top plan view of the latchable handle utilized in conjunction with the seat belt assembly of the present invention taken along line 4—4 of FIG. 1.

Referring particularly to FIGS. 1 and 2 of the drawings there is included a guide bracket 56 also mounted on the rear panel 38 of the door 12. This guide bracket 56 is capable of a limited amount of pivotal movement relative to the panel 38. This guide bracket 56 has the belt 48 being conducted therethrough and is located intermediate of the mounting bracket 54 and the latchable handle 46. It is to be noted that the guide bracket 56 is mounted between the bracket 54 and the top edge 18 of the door 12 and actually is mounted within the portion of the door 12 that is located directly adjacent the window 58 included within the door 12.

Referring particularly to FIG. 3 of the drawings, instead of utilizing the guide bracket 56 there may be included a post 60. This post 60 is fixedly mounted at its ends by post mounts 62 and 64 to the rear panel 38 of the door 12. The longitudinal center axis of the post 60 is located vertical substantially parallel to the vertical center axis 34. Slidably mounted on the post 60 is a sleeve 66. Mounted on this sleeve 66 is a guide bracket 68 which in essence is identical to guide bracket 56. It can thus be seen that for a taller or larger sized occupant 20, the sleeve 66 will be moved along the post 60 to assume an at rest position nearer post mount 64 than if the occupant 20 were of a smaller or shorter sized individual in which case the sleeve 66 would be located nearer the post mount 62.

Mounted on the front panel 36 is a female latching device 70. The latching device 70 is mounted substantially in alignment with the free outer edge 72 of the bottom 26 of the passenger seat 28. Also, the device 70 is located spaced from the sitting surface of the bottom 26. The device 70 includes an internal chamber 74 which includes an inwardly extending wall 76. The barrel 78 of the latchable handle 46 is to be locatable within the internal chamber 74 in a close fitting manner. When the barrel 78 is totally inserted within the internal chamber 74, the protruding end of a latching pawl 80 abuts against the wall 76. When the latching pawl 80 engages with the wall 76, latchable handle 46 is fixed with the female latching device 70.

Figure 6:
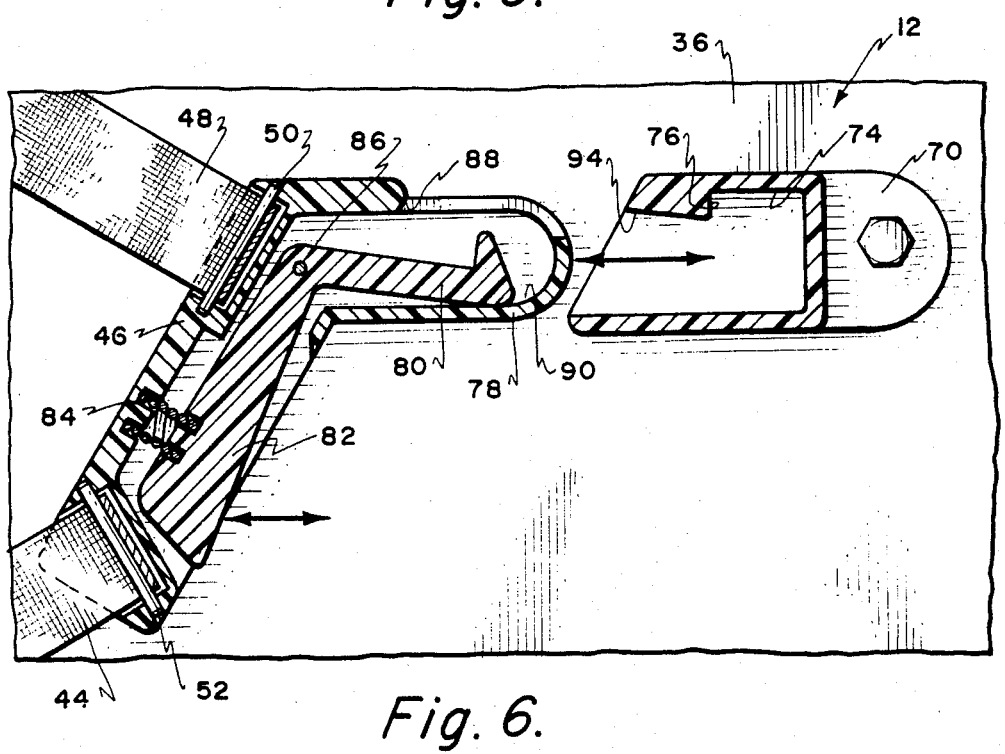
FIG. 6 is a cross-sectional view similar to FIG. 5, but showing the latchable handle in an unlatched position with the latchable handle disengaged from the door mounted female latching device.

In order to disengage the handle 46 from the device 70, the operator presses against the rear end 82 of the latching pawl 80 against the action of spring 84. As a result the latching pawl 80 pivots about pivot pin 86 so as to move the latching pawl 80 to the position shown in FIG. 6 of the drawings. As a result, the latching pawl 80 disengages from the wall 76 and the latchable handle 46 is disengageable from the female mounting device 70. When the latchable handle 46 is engaged with the device 70, the pawl 76 extends through opening 88 provided within barrel 78 to be located within the interior compartment 90 of the barrel 78 and to be thereby engageable with the latching pawl 80.

A female latching device 92 is shown mounted on the inner lateral edge of the passenger seat 28. This female latching device 92 is basically identical to the female latching device 70. In actual practice, the female latching device 92 may not be mounted directly onto the passenger seat 28, but could be mounted onto the floor of the passenger compartment 22, or could be mounted to any other fixed structure associated in close proximity to the inner edge of the passenger seat 28.

Figure 5:
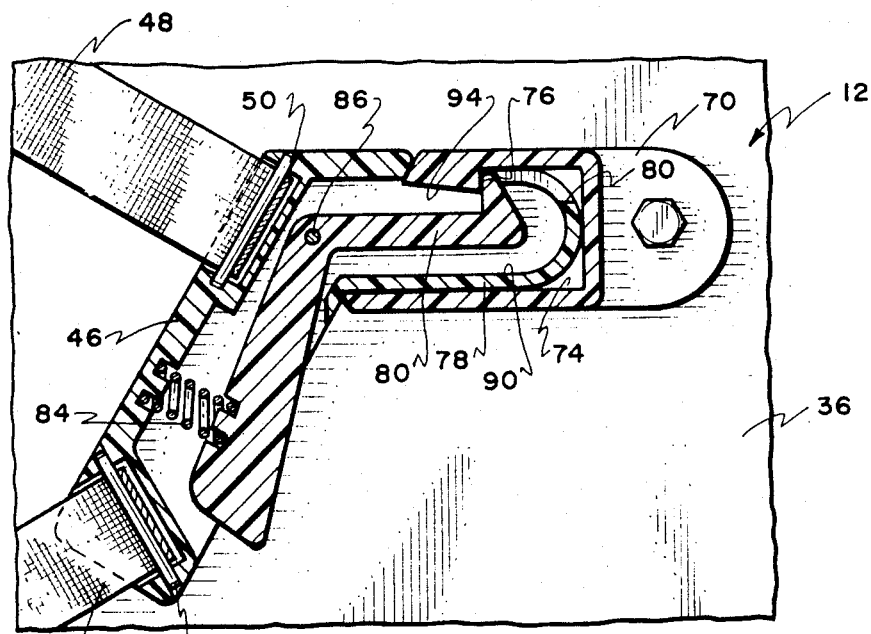
FIG. 5 is a cross-sectional view through the latchable handle taken along line 5—5 of FIG. 4 showing the latchable handle in the latched position.

The operation of the seat belt assembly of this invention is believed to be basically simple. During times that the occupant 20 enters and leaves the passenger compartment 22, the latchable handle 46 is engaged with the female mounting device 70. During this engagement the latchable handle 46 can function as a handle to open and close the door 12. When the occupant 20 is properly seated within the passenger seat 28, it is only necessary for the occupant 20 to squeeze pistol grip latchable handle 46 which will move rear end 82 of the latching pawl 80 so as to disengage the latching pawl 80 from the wall 76. At this time, latchable handle 46 can be removed from the female mounting device 70. The occupant 20 can then release pressure being applied against the rear end 82 which will permit the latching pawl 80 to pivot due to the action of the spring 84 back to the position shown in FIG. 5 of the drawings. The occupant 20 then moves the latchable handle to locate the barrel 78 within the internal chamber of the female mounting device 92. As this location occurs, the latching pawl 80 is cammed along the surface within the device 92 which is equivalent to surface 94 of device 70. After the latching pawl 80 has moved beyond the surface 94 it will then move into engagement with the wall of device 92 which is equivalent to wall 76 of device 70. At this time the latchable handle 46 is now fixedly secured to the device 92 with the result that the belt 44 is snugly located about the occupant's lap with the belt 48 also closely positioned across the chest of the occupant 20.

When it is desired that the occupant 20 leave the compartment 22, the occupant 20 only needs to disengage the latchable handle 46 from the device 92 and reinstall it in conjunction with the device 70.

Although the structure of this invention has been described in conjunction with a vehicle door, it is considered to be within the scope of this invention to utilize this structure directly on the body of a vehicle where there is no door located directly next to the passenger seat.

What is claimed is:

1. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner internal edge and an outer lateral edge, a door formed within said body, said outer lateral edge being located nearest said door, said door being hingedly movable on said body between an open position and a closed position, said open position permitting entry into and egress from said passenger compartment by a human being, said closed position preventing passage by the human being into and out of said passenger compartment, a passenger seat belt assembly mounted in conjunction with said passenger seat, said passenger seat belt comprising:
    a first belt, said first belt having a first inner end and a first outer end;
    mounting means connected to said door, said first inner end being attached to said mounting means, said mounting means being located substantially in alignment with said back when said door is in said closed position;
    a latchable handle attached to said first outer end of said first belt;
    a first latching device mounted on said door, said latching device being located spaced from said mounting means, said latchable handle being connectable with said first latching device, said latchable handle being capable of being disengaged from said first latching device;
    a second latching device mounted on said vehicle and located directly adjacent said inner lateral edge of said passenger seat, said latchable handle connectable with said second latching device when said latchable handle is disengaged from said first latching device; and
    said latchable handle being usable also as a handle for said door.

2. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, a door formed within said body, said outer lateral edge being located nearest said door, said door being hingedly movable on said body between an open position and a closed position, said open position permitting entry into and egress from said passenger compartment by a human being, said closed position preventing passage by the human being into and out of said passenger compartment, a passenger seat belt assembly mounted in conjunction with said passenger seat, said passenger seat belt comprising:
    a first belt, said first belt having a first inner end and a first outer end;
    mounting means connected to said door, said first inner end being attached to said mounting means, said mounting means being located substantially in alignment with said back when said door is in said closed position;
    a latchable handle attached to said first outer end of said first belt;
    a first latching device mounted on said door, said latching device being located spaced from said mounting means, said latchable handle being connectable with said first latching device, said latchable handle being capable of being disengaged from said first latching device;
    a second latching device mounted on said vehicle and located directly adjacent said inner lateral edge of said passenger seat, said latchable handle connectable with said second latching device when said latchable handle is disengaged from said first latching device;
    said bottom of said seat having a free outer edge, said free outer edge being spaced from said back, said first latching device being located substantially in alignment with said free outer edge when said door is in said closed position;
    said door including a front half and a rear half, said passenger seat being mounted substantially totally in juxtaposition to said rear half, said mounting means being mounted on said rear half, said first latching device being mounted on said front half; and
    a belt adjustment device mounted on said rear half of said door, said belt adjustment device permitting adjustment of the spacing of said first belt relative to said back when said latchable handle connects with said second latching device, said belt adjustment device including a post and a sleeve and a guide bracket, said first belt slidingly connecting with said guide bracket, said guide bracket being mounted on said sleeve, said sleeve being slidingly mounted on said post, said post being fixed on said door.

3. The combination as defined in claim 2 including:
    a second belt, said second belt having a second inner end and a second outer end, a belt attachment means mounted on said door, said second inner end being connected to said belt attachment means, said second outer end being attached to said latchable handle.

4. The combination as defined in claim 3 wherein:

said latchable handle assuming a pistol grip configuration, said pistol grip configuration defining an upper end and a lower end, said lower end being free, a movable latching pawl located at said upper end, said latching pawl being connectable with said first latching device and said second latching device.

5. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, a door formed within said body, said outer lateral edge being located nearest said door, said door being hingedly movable on said body between an open position and a closed position, said open position permitting entry into and egress from said passenger compartment by a human being, said closed position preventing passage by the human being into and out of said passenger compartment, a passenger seat belt assembly mounted in conjunction with said passenger seat, said passenger seat belt comprising:
- a first belt, said first belt having a first inner end and a first outer end;
- mounting means connected to said door, said first inner end being attached to said mounting means, said mounting means being located substantially in alignment with said back when said door is in said closed position;
- a latchable handle attached to said first outer end of said first belt;
- a first latching device mounted on said door, said latching device being located spaced from said mounting means, said latchable handle being connectable with said first latching device, said latchable handle being capable of being disengaged from said first latching device;
- a second latching device mounted on said vehicle and located directly adjacent said inner lateral edge of said passenger seat, said latchable handle connectable with said second latching device when said latchable handle is disengaged from said first latching device;
- said bottom of said seat having a free outer edge, said free outer edge being spaced from said back, said first latching device being located substantially in alignment with said free outer edge when said door is in said closed position;
- said door including a front half and a rear half, said passenger seat being mounted substantially totally in juxtaposition to said rear half, said mounting means being mounted on said rear half, said first latching device being mounted on said front half;
- a belt adjustment device mounted on said rear half of said door, said first belt connecting with said belt adjustment device, said belt adjustment device permitting adjustment of the spacing of said first belt relative to said back when said latchable handle connects with said second latching device;
- a second belt, said second belt having a second inner end and a second outer end, a belt attachment means mounted on said door, said second inner end being connected to said belt attachment means, said second outer end being attached to said latchable handle;
- said latchable handle assuming a pistol grip configuration, said piston grip configuration defining an upper end and a lower end, said lower end being free, a movable latching pawl located at said upper end, said latching pawl being connectable with said first latching device and said second latching device; and
- said latchable handle being usable also as a handle for said door.

6. The combination as defined in claim 5 wherein:
said first outer end of said first belt being fixedly secured to said piston grip at said upper end.

7. The combination as defined in claim 6 wherein:
said second outer end of said second belt being fixedly secured to said pistol grip at said lower end.

8. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, a door formed within said body, said outer lateral edge being located nearest said door, said door being hingedly movable on said body between an open position and a closed position, said open position permitting entry into and egress from said passenger compartment by a human being, said closed position preventing passage by the human being into and out of said passenger compartment, a passenger seat belt assembly mounted in conjunction with said passenger seat, said passenger seat belt comprising:
- a first belt, said first belt having a first inner end and a first outer end;
- mounting means connected to said door, said first inner end being attached to said mounting means, said mounting means being located substantially in alignment with said back when said door is in said closed position;
- a latchable handle attached to said first outer end of said first belt;
- a first latching device mounted on said door, said latching device being located spaced from said mounting means, said latchable handle being connectable with said first latching device, said latchable handle being capable of being disengaged from said first latching device;
- a second latching device mounted on said vehicle and located directly adjacent said inner lateral edge of said passenger seat, said latchable handle connectable with said second latching device when said latchable handle is disengaged from said first latching device;
- said latchable handle assuming a pistol grip configuration, said pistol grip configuration defining an upper end and a lower end, said lower end being free, a movable latching pawl located at said upper end, said latching pawl being connectable with said first latching device and said second latching device; and
- said first outer end of said first belt being fixedly secured to said pistol grip at said upper end, said second outer end of said second belt being fixedly secured to said pistol grip at said lower end.

9. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, a door formed within said body, said outer lateral edge being located nearest said door, said door being hingedly movable on said body between an open position and a closed position, said open position permitting entry into and egress from said passenger compartment by a human being, said closed position preventing passage by the human being into and out of said passenger compartment, a passenger seat belt assembly mounted in conjunction with said passenger seat, said passenger seat belt comprising:

a first belt, said first belt having a first inner end and a first outer end;

mounting means connected to said door, said first inner end being attached to said mounting means, said mounting means being located substantially in alignment with said back when said door is in said closed position;

a latchable handle attached to said first outer end of said first belt;

a first latching device mounted on said door, said latching device being located spaced from said mounting means, said latchable handle being connectable with said first latching device, said latchable handle being capable of being disengaged from said first latching device;

a second latching device mounted on said vehicle and located directly adjacent said inner lateral edge of said passenger seat, said latchable handle connectable with said second latching device when said latchable handle is disengaged from said first latching device;

said latchable handle assuming a pistol grip configuration, said pistol grip configuration defining an upper end and a lower end, said lower end being free, a movable latching pawl located at said upper end, said latching pawl being connectable with said first latching device and said second latching device; and said latchable handle being usable also as a handle for said door.

10. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, said outer lateral edge being located nearest said body, a passenger seat belt assembly mounted in conjunction with said passenger seat, said passenger seat belt comprising:

a first belt, said first belt having a first inner end and a first outer end;

mounting means connected to said body, said first inner end being attached to said mounting means, said mounting means being located substantially in alignment with said back;

a latchable handle attached to said first outer end of said first belt;

a first latching device mounted on said body, said latching device being located spaced from said mounting means, said latchable handle being connectable with said first latching device, said latchable handle being capable of being disengaged from said first latching device;

a second latching device mounted on said vehicle and located directly adjacent said inner lateral edge of said passenger seat, said latchable handle connectable with said second latching device when said latchable handle is disengaged from said first latching device;

said latchable handle being usable also as a handle for said door.

11. The combination of defined in claim 10 wherein:

a belt adjustment device mounted on said body, said belt adjustment device permitting adjustment of the spacing of said first belt relative to said back when said latchable handle connects with said second latching device, said belt adjustment device including a post and a sleeve and a guide bracket, said first belt slidingly connecting with said guide bracket, said guide bracket being mounted on said sleeve, said sleeve being slidingly mounted on said post, said post being fixed on said body.

12. The combination as defined in claim 11 wherein:

said latchable handle assuming a pistol grip configuration, said pistol grip configuration defining an upper end and a lower end, said lower end being free, a movable latching pawl located at said upper end, said latching pawl being connectable with said first latching device and said second latching device.

13. THe combination as defined in claim 12 wherein:

said first outer end of said first belt being fixedly secured to said pistol grip at said upper end.

14. The combination as defined in claim 13 wherein:

said second outer end of said second belt being fixedly secured to said pistol grip at said lower end.

15. In combination with a vehicle, said vehicle having a body, a passenger compartment located within said body, a passenger seat mounted to said body and positioned within said passenger compartment, said passenger seat having a bottom and a back, said back extending substantially at a right angle to said bottom, said bottom defining a substantially horizontal sitting surface and said back defining a substantially vertical backrest surface, said passenger seat having an inner lateral edge and an outer lateral edge, said outer lateral edge being located nearest said body, a passenger seat belt assembly mounted in conjunction with said passenger seat, said passenger seat belt comprising:

a first belt, said first belt having a first inner end and a first outer end;

mounting means connected to said body, said first inner end being attached to said mounting means, said mounting means being located substantially in alignment with said back;

a latchable handle attached to said first outer end of said first belt;

a first latching device mounted on said body, said latching device being located spaced from said mounting means, said latchable handle being connectable with said first latching device, said latchable handle being capable of being disengaged from said first latching device;

a second latching device mounted on said vehicle and located directly adjacent said inner lateral edge of said passenger seat, said latchable handle connectable with said second latching device when said latchable handle is disengaged from said first latching device; and said latchable handle assuming a pistol grip configuration, said pistol grip configuration defining an upper end and a lower end, said lower end being free, a movable latching pawl located at said upper end, said latching pawl being connectable with said first latching device and said second latching device, said latchable handle being usable also as a handle for said door.

* * * * *